April 21, 1925.

S. A. LAWRENCE

FISHHOOK

Filed Nov. 7, 1923

1,534,969

S. A. Lawrence
INVENTOR
BY Victor J. Evans
ATTORNEY

WITNESS:
Paul M. Hunt

Patented Apr. 21, 1925.

1,534,960

UNITED STATES PATENT OFFICE.

STEPHEN A. LAWRENCE, OF OKMULGEE, OKLAHOMA.

FISHHOOK.

Application filed November 7, 1923. Serial No. 673,354.

*To all whom it may concern:*

Be it known that I, STEPHEN A. LAWRENCE, a citizen of the United States, residing at Okmulgee, in the county of Okmulgee and State of Oklahoma, have invented new and useful Improvements in Fishhooks, of which the following is a specification.

This invention relates to devices for catching fish and has for its object the provision of a spring hook structure of a trap like nature which will be released by movement of a trigger so as to catch the fish.

An important and more specific object is the provision of a device of this character including a plurality of elongated arms terminating in hooks normally held by a trigger in a set position, means being provided for forcibly swinging these hooks together so as to catch into the body of the fish when the trigger is disturbed.

An additional object is the provision of a device of this character which will be simple and inexpensive to manufacture, easy to set, automatic in action, efficient and durable in service and a general improvement in the art.

With the above and other objects and advantages in view the invention consists in the details of construction to be hereinafter more fully described and claimed and illustrated in the accompanying drawings, in which:

Figure 1:
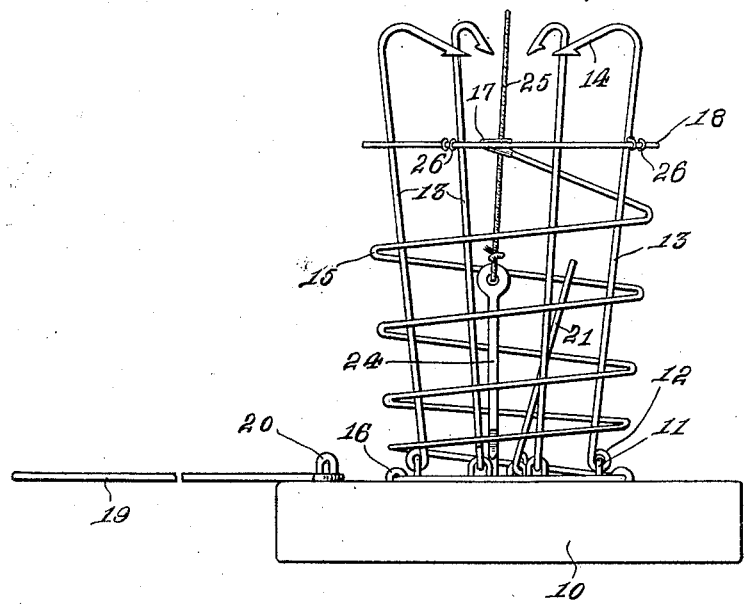
Figure 1 is a side elevation of the device showing it in sprung position.

Referring more particularly to the drawing the numeral 10 designates a base on which are mounted eye or loop like staple elements 11 within which are pivoted the looped inner ends 12 of arms 13 which terminate at their outer ends in barbed hooks 14 which all face inwardly. Disposed outwardly of all the arms 13 is a tapered coil spring 15 which has its smaller end disposed upon the base and secured thereto by clips or staples 16 and which has its upper end connected at 17 with a ring 18 slidably engageable with the arms 13 and disposed outwardly thereof.

Figure 2:
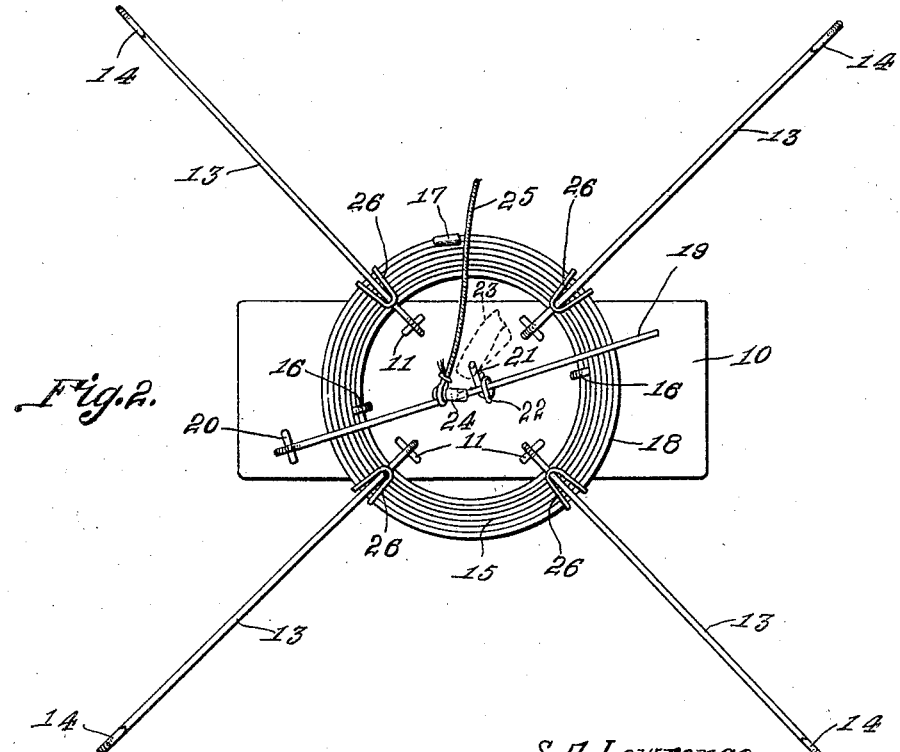
Figure 2 is a plan view showing it in set position.

The trigger means comprises a rod 19 pivoted at one end upon a staple 20 and adapted to be disposed against the top of the ring 18 when the spring 15 is compressed and the arms 13 moved outwardly into the flat position shown in Figure 2. The rod is held in this active position by a trigger 21 which has a projection 22 engageable over the rod 19, this trigger also serving as a holder for bait 23 which is impaled thereon. Rising from the base is a post 24 to which may be attached a string 25 for lowering the device into the water.

To effect setting, pressure is applied to the ring 18 so as to force it down toward the base and owing to the fact that the succussive convolutions of the spring progress in diameter upwardly, it is apparent that all the convolutions will lie flat upon the base. It should be mentioned that the ring 18 is formed with inwardly extending open ended guides 26 which will prevent the arms 13 from displacement laterally or in other words so as to hold the arms in a true radial position. After the spring is thus compressed the rod 19 is swung over the top thereof and the trigger 21 has its projection 22 engaged with the rod. Of course prior to setting the bait must be engaged upon the trigger. The device will then have the appearance shown in Figure 2 and may be lowered into the water to any desired depth by means of the line or string 25.

In the operation it will be seen that when a fish nibbles or bites upon the bait it will cause lateral displacement of the trigger 21 which will then disengage the rod 19 so that the upward pressure or tension of the spring 15 will force the ring 18 upwardly, swinging all the hooks upwardly and toward each other into the position shown in Figure 1, the hooks engaging into the body of the fish.

From the foregoing description and a study of the drawings it will be apparent that I have thus provided a very simple, inexpensive and highly efficient fish catcher which involves very few parts, which is easy to set and which should insure a large catch, especially on account of its sensitiveness.

While I have shown and described the preferred embodiment of my invention it is of course to be understood that I reserve the right to make such changes in the form, construction and arrangement of parts as will not depart from the spirit of the invention or the scope of the subjoined claims.

Having thus described my invention I claim:

1. A fish catcher comprising a base, a suspension element connected therewith, a plurality of arms pivoted upon the base in radial arrangement and terminating in hooks, a spring secured upon the base outwardly of the arms, a ring at the top of the spring likewise disposed outwardly of the arms, a rod engageable over said ring when the spring is compressed, and a bait carrying trigger pivoted on the base and having a projection engaging over said rod.

2. A fish catcher comprising a base, a suspension element connected therewith, a plurality of arms pivoted upon the base in radial arrangement and terminating in hooks, a spring secured upon the base outwardly of the arms, a ring at the top of the spring likewise disposed outwardly of the arms, a rod engageable over said ring when the spring is compressed, a bait carrying trigger pivoted on the base and having a projection engaging over said rod, said spring being tapered with its uppermost convolutions of progressively greater diameter than the preceding ones, whereby all the convolutions will lie flat upon the base when the spring is compressed.

3. A device of the character described comprising a base, a circular series of staples carried thereby, a plurality of arms having eyes engaged within said staples and terminating in hooks, a spring secured at one end upon the base outwardly of said arms, a ring disposed outwardly of the arms and connected with the upper end of the spring, said ring being formed with inwardly extending guides for said arms, a rod pivoted at one end upon the base and engageable over the ring for holding the spring compressed, and a bait carrying trigger pivoted on the base and having a projection engageable over the rod for holding the same against movement.

In testimony whereof I affix my signature.

STEPHEN A. LAWRENCE.